United States Patent
Gerst et al.

(10) Patent No.: US 6,426,377 B1
(45) Date of Patent: Jul. 30, 2002

(54) METHOD FOR IMPROVED STABILITY OF AQUEOUS POLYMER DISPERSIONS

(75) Inventors: Matthias Gerst, Neustadt; Bernhard Schuler, Mannheim; Burkhardt Dames, Neuwied, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/581,552

(22) PCT Filed: Jan. 15, 1999

(86) PCT No.: PCT/EP99/00212

§ 371 (c)(1), (2), (4) Date: Jul. 14, 2000

(87) PCT Pub. No.: WO99/36444

PCT Pub. Date: Jul. 22, 1999

(30) Foreign Application Priority Data

Jan. 16, 1998 (DE) .......................... 198 01 442

(51) Int. Cl.[7] .............................. C08K 5/36; C08K 5/42
(52) U.S. Cl. ..................... 524/166; 524/748; 528/486
(58) Field of Search ................ 524/166, 748; 528/486

(56) References Cited

U.S. PATENT DOCUMENTS

| | | | | |
|---|---|---|---|---|
| 3,506,604 A | * | 4/1970 | Benjamin | |
| 3,563,944 A | * | 2/1971 | Bauer et al. | |
| 3,657,182 A | * | 4/1972 | Jolly | |
| 4,129,698 A | * | 12/1978 | Park et al. | 526/225 |
| 4,238,380 A | * | 12/1980 | Alford | 524/820 |
| 4,345,044 A | * | 8/1982 | Columbus et al. | |
| 4,898,909 A | * | 2/1990 | Vietmeier et al. | 524/820 |
| 5,106,903 A | * | 4/1992 | Vanderhoff et al. | 524/166 |
| 5,352,720 A | * | 10/1994 | Aydin et al. | 524/166 |
| 5,356,968 A | * | 10/1994 | Rupaner et al. | 524/748 |
| 5,492,950 A | * | 2/1996 | Brown et al. | 524/156 |
| 5,554,726 A | | 9/1996 | Arak et al. | 524/565 |

FOREIGN PATENT DOCUMENTS

| | | | |
|---|---|---|---|
| EP | 671448 A | * | 9/1995 |
| EP | 680992 A | * | 11/1995 |
| GB | 1462984 | * | 1/1977 |
| JP | 09-188794 | * | 7/1997 |

OTHER PUBLICATIONS

Volume Abstracts of Japan, vol. 097, No. 011, Nov. 28, 1997 Du Pont Mitsui Fluorochem. Co. Ltd.*
WO 9112290 A published Aug. 22, 1991.*
Journal of Applied Polymer Science, vol. 55, No. 10, Mar. 7, 1995, pp. 1411–1415, XP00516818, Hur et al: "Monsdisperse . . . Polymerization" X P00516818, Hur et al: "Monsdisperse . . . Polymerization".*
Technical Information from BASF, TI/ED 1342d, pp. 2–3, "LUMITEN I–RA", Jun. 1992.
J. Schwartz, Journal of Coating Technology, vol. 64, No. 812, pp. 65–74, "The Importance of Low Dynamic Surface Tension in Waterborne Coatings", Sep. 1992.

* cited by examiner

Primary Examiner—Peter Szekely
(74) Attorney, Agent, or Firm—Oblon, Spivak, McClelland, Maier & Neustadt, P.C.

(57) ABSTRACT

The present invention relates to a process for improving the stability of aqueous polymer dispersions to thermal and/or mechanical effects and comprises adding to said aqueous polymer dispersions at least one salt of a bis-$C_4$–$C_{18}$-alkyl ester of a sulfonated dicarboxylic acid having 4 to 8 carbon atoms.

6 Claims, No Drawings

METHOD FOR IMPROVED STABILITY OF AQUEOUS POLYMER DISPERSIONS

The present invention relates to a process for improving the stability of aqueous polymer dispersions to thermal and/or mechanical stress (=exposure).

Owing to the large surface area of the dispersed polymer particles, aqueous polymer dispersions constitute metastable systems. They have a propensity to reduce their surface area while enlarging the polymer particles present within them and in this way of attaining a more energetically advantageous state. In general, aqueous polymer dispersions are kinetically stable to these changes. If, however, they are subjected to thermal or mechanical stress, there is a risk of particle enlargement. Thermal stressing of polymer dispersions occurs, for example, in the course of physical deodorization: for example, when the aqueous dispersions are stripped with steam or when solvents are removed by distillation. Aqueous polymer dispersions undergo mechanical stress in the course, in particular, of processes which entail shear forces: for example, in the course of stirring, pumping or filtering the dispersions.

An uncontrolled change in the particle sizes of aqueous polymer dispersions is undesirable for a number of reasons. Firstly, there is the danger that microcoagulum (gel specks) will be formed or that the dispersion will coagulate and become unusable. Secondly, a number of applications-related properties, such as viscosity and film formation, depend on the specific size and/or size distribution of the polymer particles within the aqueous polymer dispersion. An irreproducible change in these particle sizes must therefore be avoided in view of the stringent applications-related requirements placed on aqueous polymer dispersions.

It is known fundamentally that surface-active substances such as emulsifiers and protective colloids (the latter can be interpreted as polymeric emulsifiers) improve the stability of aqueous polymer dispersions. The surface-active substances commonly used for this purpose, however, are unable to provide aqueous polymer dispersions with effective stabilization against changes in the particle size distribution of the dispersed polymer particles in the course of thermal and/or mechanical stress.

The use of sodium salts of sulfosuccinic acid dialkyl esters for improving the wetting power of aqueous polymer dispersions is known (Technical Information from BASF, TI/ED 1342d, 1992). J. Schwartz (J. Coating Tech. 64, No. 812, 1992, p. 62) describes the use of the sodium salt of di-n-octyl sulfosuccinate for improving the quality of coatings based on aqueous polymer dispersions.

It is an object of the present invention to provide a process which permits effective stabilization of aqueous polymer dispersions against changes in the particle size distribution.

We have found that this object is achieved by adding salts of the bis-$C_4$–$C_{18}$-alkyl esters of sulfonated dicarboxylic acids having 4 to 8 carbon atoms to aqueous polymer dispersions.

The present invention accordingly provides a process for improving the stability of aqueous polymer dispersions to thermal and/or mechanical effects which comprises adding at least one salt of a bis-$C_4$–$C_{18}$-alkyl ester of a sulfonated dicarboxylic acid having 4 to 8 carbon atoms (=salts S) to the aqueous polymer dispersion.

By $C_4$–$C_{18}$-alkyl is meant linear or branched alkyl having 4 to 18 carbon atoms, e.g. n-butyl, 2-butyl, isobutyl, 2-methylbutyl, 2-ethylbutyl, 1,3-dimethylbutyl, n-pentyl, 2-pentyl, 2-methylpentyl, n-hexyl, 2-methylhexyl, 2-ethylhexyl, n-heptyl, 2-heptyl, 2-methylheptyl, 2-propylheptyl, n-octyl, 2-methyloctyl, n-nonyl, 2-methylnonyl, n-decyl, 2-methyldecyl, n-undecyl, 2-methylundecyl, n-dodecyl, 2-methyldodecyl, n-tridecyl, 2-methyltridecyl, n-tetradecyl, n-hexadecyl and n-octadecyl. Examples of sulfonated dicarboxylic acids having 4 to 8 carbon atoms are sulfonated succinic, glutaric, adipic, phthalic and isophthalic acids.

Preferred salts S are the salts of bis-$C_4$–$C_{18}$-alkyl esters of sulfonated succinic acids, especially the salts of bis-$C_6$–$C_{12}$-alkyl esters of sulfonated succinic acid.

It is further preferred for the salts S to comprise the potassium, calcium, ammonium and, in particular, the sodium salts of the abovementioned sulfonated dicarboxylic esters. Especially preferred salts S are the sodium salts of the bis-n-octyl ester and of the bis-2-ethylhexyl ester of sulfosuccinic acid.

Depending on the stability of the aqueous polymer dispersion at least one salt S will be added to the aqueous polymer dispersion, generally in an amount of at least 0.1% by weight, preferably at least 0.2% by weight and, in particular, at least 0.3% by weight, based on the weight of the disperse polymer in the aqueous polymer dispersion. The amount of salt S employed will generally be not more than 5% by weight, preferably not more than 3% by weight and, in particular, not more than 2% by weight, based on the weight of the disperse polymer in the aqueous polymer dispersion. The amount of salt S required for stabilization will fall as the size of the particles in the aqueous polymer dispersion increases. Polymers having a large number of negative charge centers likewise require a smaller amount of salt S for stabilization than polymers having a small number of negative charge centers. Negative charge centers result from copolymerized monomers having acidic groups. The number of negative charge centers in the polymer is, of course, dependent on the pH of the aqueous polymer dispersion.

The stabilizing effect of the salts S, in accordance with the invention, is particularly marked with aqueous polymer dispersions in which the polymer particles have a ponderal median particle diameter ($d_{50}$) in the range from 50 to 1000 nm and, preferably, in the range from 100 to 600 nm. The statistical distribution of the polymer particle diameters can be either monomerical or polymerical. Here and below, the ponderal median particle diameter which is indicated is that diameter which is exceeded and fallen short of by 50% by weight of the polymer particles in the aqueous dispersion ($d_{50}$). The particle size distribution in the aqueous dispersion can be determined by customary methods; for example, using an analytical ultracentrifuge in accordance with the methods of W. Scholtan and H. Lange, Kolloid-Z. u. Z. Polymere 250 (1972), 782-796. The ultracentrifuge measurement gives the integral mass distribution of the particle diameter of a sample, from which it is easy to derive the $d_{50}$. Reference may be made at this point to other methods of determining the polymer particle diameter (see Ullmann's Encyclopedia of Industrial Chemistry, 5th ed., Vol. A21, p. 186).

In addition, the light transmissitivity of dilute samples of aqueous polymer dispersions constitutes an indirect measure of the size of the polymer particles (see Ullmann's Encyclopedia of Industrial Chemistry, loc. cit.). A change in the light transmissitivity by more than two percentage points, resulting from thermal or mechanical stress, indicates a change in the average particle size or in the particle size distribution in the aqueous polymer dispersion.

In general, the polymer in the aqueous polymer dispersion will have a glass transition temperature $T_g$ in the range from −80 to +100° C. The stabilizing effect of the process of the invention is manifested preferentially when the polymer in the aqueous polymer dispersion has a glass transition temperature of below 80° C. and, in particular, below 50° C. The process of the invention is employed with particular preference if the polymer in the aqueous polymer dispersion has a glass transition temperature of below 30° C., in particular below 20° C. and, with very particular preference, below 10° C. The polymer in the aqueous polymer dispersion will preferably have a glass transition temperature of above −60° C. and, in particular, above −50° C. One specific embodiment of the present invention relates to the stabilization of aqueous polymer dispersions whose copolymerized polymers have a glass transition temperature $T_g$ in the range from 0 to −40° C. The values stated for the glass transition temperature relate to the midpoint temperature as determined in accordance with ASTM D 3418-82 by means of DSC (differential scanning calorimetry).

The glass transition temperature of polymers which are composed of ethylenically unsaturated monomers M can also be estimated by known techniques. According to Fox (T. G. Fox, Bull. Am. Phys. Soc. (Ser. II) 1, 123 [1956] and Ullmann's Enzyklopädie der technischen Chemie, Weinheim (1980), pp. 17, 18) the glass transition temperature of copolymers at high molecular masses is given in good approximation by $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions $1, 2, \ldots, n$ and $T_g^1, T_g^2, \ldots, T_g^n$ are the glass transition temperatures of the homopolymers of each of the monomers $1, 2, \ldots, n$, in kelvins. These are known, for example, from Ullmann's Encyclopedia of Industrial Chemistry, VCH, Weinheim, Vol. A 21 (1992) p. 169 or from J. Brandrup, E. H. Immergut, Polymer Handbook 3$^{rd}$ ed, J. Wiley, New York 1989.

In general, the process of the invention is applied to aqueous polymer dispersions whose polymers are composed of ethylenically unsaturated monomers M. The process of the invention can of course also be applied to aqueous dispersions of other polymers; for example, to aqueous polyurethane dispersions or polyester dispersions. The process of the invention can be applied both to those polymer dispersions which are obtainable by converting polymer solutions or polymer melts to aqueous dispersions (and which are hence known as secondary dispersions), and to those polymer dispersions which are obtainable by free-radical, aqueous emulsion polymerization of ethylenically unsaturated monomers M (hence primary dispersions).

The polymers in the aqueous polymer dispersions are preferably composed of ethylenically unsaturated monomers M; in other words, they are obtainable by polymerization—especially free-radical, aqueous emulsion polymerization—of the monomers M.

Suitable monomers M comprise in general at least one monomer M1 which is selected from vinylaromatic monomers such as styrene, α-methylstyrene, ortho-chlorostyrene or vinyltoluenes, the vinyl ethers of aliphatic monocarboxylic acids having 1 to 12 carbon atoms, such as vinyl acetate, propionate, butyrate, valerate, hexanoate, 2-ethylhexanoate, decanoate and laurate and vinyl Versatate® (vinyl esters of branched, aliphatic carboxylic acids having 6 to 11 carbon atoms, which are in commerce as Versatic® X acids from SHELL AG). Other suitable monomers M1 are esters of α,β-ethylenically unsaturated $C_3$–$C_8$ mono- or $C_4$–$C_8$ dicarboxylic acids with $C_1$–$C_{12}$- and, in particular, $C_1$–$C_8$-alkanols or $C_5$–$C_8$-cycloalkanols. Examples of suitable $C_1$–$C_{12}$-alkanols are methanol, ethanol, n-propanol, isopropanol, 1-butanol, 2-butanol, isobutanol, tert-butanol, n-hexanol and 2-ethylhexanol. Examples of suitable cycloalkanols are cyclopentanol and cyclohexanol. Particularly suitable are the esters of acrylic, methacrylic, crotonic, maleic, itaconic, citraconic or fumaric acid. Specifically, these may be methyl, ethyl, n-butyl, isobutyl, tert-butyl, 1-hexyl or 2-ethylhexyl (meth)acrylate or dimethyl or di-n-butyl maleate. The monomers M1 also embrace monomers such as butadiene, $C_2$–$C_6$ olefins, such as ethylene, 1-propene, 1-butene, isobutene and 1-hexene, and vinyl chloride and vinylidene chloride.

In general, the monomers M1 account for at least 50% by weight, preferably at least 80% by weight, in particular from 90 to 99.9% by weight and, with very particular preference, from 95 to 99.5% by weight of the monomers M to be polymerized.

In a preferred embodiment of the present invention the monomers M1 comprise:

from 25 to 100% by weight, in particular from 50 to 99% by weight and, with very particular preference, from 30 to 95% by weight of at least one monomer M1a selected from the $C_1$–$C_{12}$-alkyl esters, in particular from the $C_2$–$C_8$-alkyl esters, of acrylic acid, and from 0 to 75% by weight, in particular from 1 to 50% by weight and, with very particular preference, from 5 to 30% by weight of at least one monomer M1b selected from the $C_1$–$C_4$-alkyl esters of methacrylic acid, such as methyl methacrylate, ethyl methacrylate, n-butyl methacrylate and tert-butyl methacrylate, and vinylaromatic monomers, such as styrene and α-methylstyrene, for example, where the weight of the monomers M1a and M1b adds up to 100% by weight.

The polymers dispersed in the aqueous polymer dispersions that are to be stabilized in accordance with the invention frequently also comprise copolymerized monomers which have an acidic functional group. This applies in particular to those polymers which comprise copolymerized vinylaromatic compounds and/or one or more of the above-mentioned alkyl esters of ethylenically unsaturated carboxylic acids. Examples of monomers M2 having acidic functional groups are ethylenically unsaturated mono- and dicarboxylic acids, such as acrylic, methacrylic, acrylamidoglycolic, crotonic, itaconic, fumaric and maleic acid, and the monoesters of ethylenically unsaturated dicarboxylic acids with $C_1$–$C_{12}$-alkanols, such as monomethyl maleate and mono-n-butyl maleate, for example. The monomers M2 also include monomers with sulfonic acid groups and/or phosphonic acid groups, or salts thereof, especially their alkali metal salts. Examples thereof are vinyl- and allylsulfonic acid, (meth)acrylamidoethanesulfonic acid, (meth)acrylamido-2-methylpropanesulfonic acid, vinyl- and allylphosphonic acid, (meth)acryloxyethylphosphonic acid, (meth)acrylamidoethanephosphonic acid and (meth) acrylamido-2-methylpropanephosphonic acid. Where desired, the monomers M2 are used in amounts of from 0.1 to 10% by weight and, in particular, in amounts of from 0.2 to 5% by weight, based on the overall weight of the monomers M.

The dispersed polymers may also comprise copolymerized monomers M3 which are of increased solubility in water, i.e. greater than 60 g/l at 25° C., and which unlike the monomers M2 do not contain any neutralizable acidic group. They include the amides of the abovementioned ethylenically unsaturated carboxylic acids, such as acrylamide and methacrylamide, N-vinyllactams, such as N-vinylpyrrolidone and N-vinylcaprolactam, and also acrylonitrile and methacrylonitrile. Where desired, the monomers M3 are employed in amounts of from 0.1 to 10% by weight, based on the overall weight of the monomers M to be polymerized, and in the case of the monomers acrylonitrile and methacrylonitrile the amounts in which they are present may also be up to 50% by weight and, preferably, up to 30% by weight.

The dispersed polymers may additionally comprise copolymerized monomers M4 which raise the crosslinking density of the polymers. These polymers are copolymerized in a minor amount, generally up to 10% by weight, preferably up to 5% by weight and, in particular, up to 1% by weight, based on the overall amount of the monomers to be polymerized. The monomers M4 comprise compounds which in addition to a polymerizable double bond contain at least one epoxy, hydroxyl, N-alkylol or carbonyl group. Examples thereof are the N-hydroxyalkyl amides and N-alkylol amides of $\alpha,\beta$-monoethylenically unsaturated carboxylic acids having 3 to 10 carbon atoms, such as 2-hydroxyethyl(meth)acrylamide and N-methylol(meth)acrylamide, the hydroxyalkyl esters of said ethylenically unsaturated carboxylic acids, such as hydroxyethyl, hydroxypropyl and hydroxybutyl (meth)acrylate, and also the ethylenically unsaturated glycidyl ethers and glycidyl esters, such as vinyl, allyl and methallyl glycidyl ether, glycidyl acrylate and glycidyl methacrylate, the diacetonylamides of the abovementioned ethylenically unsaturated carboxylic acids, such as diacetonyl(meth)acrylamide, and the esters of acetylacetic acid with the abovementioned hydroxyalkyl esters of ethylenically unsaturated carboxylic acids, such as acetylacetoxyethyl (meth)acrylate. The monomers M4 also embrace compounds which have two nonconjugated, ethylenically unsaturated bonds, examples being the diesters of dihydric alcohols with $\alpha,\beta$-monoethylenically unsaturated $C_3$–$C_{10}$ monocarboxylic acids. Examples of compounds of this type are alkylene glycol diacrylates and dimethacrylates, such as ethylene glycol diacrylate, 1,3-butylene glycol diacrylate, 1,4-butylene glycol diacrylate, propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate, tricyclodecenyl (meth)acrylate, N,N'-divinylimidazolin-2-one or triallyl cyanurate.

Depending on the intended application, the dispersed polymers may also include modifying monomers in copolymerized form. These include hydrophobically modifying monomers, monomers which raise the wet adhesion of coatings based on aqueous polymer dispersions, and monomers which enhance the pigment-binding power of aqueous polymer dispersions, insofar as the polymer dispersions are employed as binders for emulsion paints.

Monomers which improve the wet adhesion include, in particular, polymerizable derivatives of imidazolidin-2-one (see e.g. EP-A 184 091, U.S. Pat. No. 4,219,454). Monomers which enhance the pigment-binding power of aqueous polymer dispersions are, as is known, siloxane-containing monomers (see e.g. EP-A 327 006, EP-A 327 376).

The aqueous polymer dispersions that are to be stabilized in accordance with the invention may also include, in copolymerized form, hydrophobically and/or hydrophilically modifying monomers. The former are, in particular, those monomers of low solubility in water (i.e. less than 0.01 g/l at 25° C.). Examples of these include the $C_{13}$–$C_{22}$-alkyl esters of ethylenically unsaturated carboxylic acids, such as stearyl acrylate and stearyl methacrylate, the vinyl and allyl esters of saturated fatty acids, such as vinyl stearate, olefins having more than 6 carbon atoms, and $C_2$–$C_4$-alkyl-substituted vinylaromatic compounds, such as tert-butylstyrene, for example.

The aqueous polymer dispersions to be stabilized in accordance with the invention are preferably prepared by free-radical aqueous emulsion polymerization of the abovementioned monomers in the presence of at least one free-radical polymerization initiator and, if desired, of a surface-active substance.

Suitable free-radical polymerization initiators are all those which are capable of initiating a free-radical aqueous emulsion polymerization. They may be either peroxides, such as alkali metal peroxodisulfates, or azo compounds. Also commonly used as polymerization initiators are redox initiators, which are composed of at least one organic reductant and at least one peroxide and/or hydroperoxide, an example being tert-butyl hydroperoxide with sulfur compounds, such as the sodium salt of hydroxymethanesulfinic acid, sodium sulfite, sodium disulfite, sodium thiosulfate or acetone bisulfite, or hydrogen peroxide with ascorbic acid. Use is also made of combined systems which include a small amount of a metal compound that is soluble in the polymerization medium and whose metal component can exist in a plurality of valence states, such as ascorbic acid/iron(II) sulfate hydrogen peroxide, where the ascorbic acid is frequently replaced by the sodium salt of hydroxymethanesulfinic acid, acetone bisulfite, sodium sulfite, sodium hydrogen sulfite or sodium bisulfite and the hydrogen peroxide by organic peroxides such as tert-butyl hydroperoxide or alkali metal peroxodisulfates and/or ammonium peroxodisulfate. Preferred initiators are likewise peroxodisulfates, such as sodium peroxodisulfate. The amount of the free-radical initiator systems employed, based on the overall amount of the monomers to be polymerized, is preferably from 0.1 to 2% by weight.

Surface-active substances suitable for conducting the emulsion polymerization are the emulsifiers and protective colloids which are commonly employed for these purposes. The surface-active substances are normally employed in amounts of up to 5% by weight, preferably from 0.1 to 5% by weight and, in particular, from 0.2 to 3% by weight, based on the monomers to be polymerized.

Examples of suitable protective colloids are polyvinyl alcohols, starch derivatives and cellulose derivatives, or vinylpyrrolidone copolymers. A detailed description of further suitable protective colloids is given in Houben-weyl, Methoden der organischen Chemie, Volume XIV/1, Makromolekulare Stoffe [Macromolecular Substances], Georg-Thieme-Verlag, Stuttgart 1961, pp. 411-420. Mixtures of emulsifiers and/or protective colloids can also be used. As the surface-active substances it is preferred to employ exclusively emulsifiers, whose relative molecular weights, in contradistinction to those of the protective colloids, are normally below 2000. They may be either anionic or nonionic in nature.

The anionic emulsifiers include alkali metal and ammonium salts of alkyl sulfates (alkyl: $C_8$–$C_{12}$), of sulfuric monoesters of ethoxylated alkanols (EO units: 2 to 50, alkyl: $C_{12}$ to $C_{18}$) and ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$). Other suitable emulsifiers are given in Houben-Weyl, op. cit., pp. 192-208). The abovementioned salts S are also suitable anionic emulsifiers, especially the salts of sulfonated succinic acid di-$C_4$–$C_{18}$-alkyl esters and, of these, with particular preference the sodium salts.

Other preferred anionic emulsifiers are mono- and di-$C_4$–$C_{24}$-alkyl derivatives of disulfonated diphenyl ether and its salts. The mono- and di-$C_6$–$C_{18}$-alkyl derivatives are particularly preferred. Use is frequently made of technical-grade mixtures which have a proportion of from 50 to 90% by weight of the monoalkylated product, an example being Dowfax® 2A1 (trademark of Dow Chemical Company). The compounds are known, for example, from U.S. Pat. No. 4,269,749 and are obtainable commercially.

In addition to the abovementioned anionic emulsifiers it is also possible to use nonionic emulsifiers. Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and polyethylene oxide/polypropylene oxide block copolymers. Preference is given to ethoxylates of long-chain alkanols (alkyl: $C_{10}$–$C_{22}$, average degree of ethoxylation: 3 to 50) and, of these, particular preference to those based on naturally occurring alcohols or on oxo alcohols having a linear or branched $C_{12}$–$C_{18}$-alkyl radical and a degree of ethoxylation of from 8 to 50.

The molecular weight of the polymers can be adjusted by adding small amounts—generally up to 2% by weight, based on the monomers to be polymerized—of one or more molecular weight regulators, examples being organic thiocompounds, silanes, allyl alcohols or aldehydes.

The emulsion polymerization can be carried out either continuously or by a batch procedure, preferably by a semicontinuous procedure. In such procedures the monomers to be polymerized can be added continuously, including by a stepwise or gradient procedure, to the polymerization mixture.

In addition to the seed-free preparation, it is possible in order to establish a defined polymer particle size to conduct the emulsion polymerization by the seed latex technique or in the presence of seed latex prepared in situ. Techniques for this purpose are known and can be found in the prior art (see EP-B 40419, EP-A-614 922, EP-A-567 812 and literature cited therein, and also Encyclopedia of Polymer Science and Technology, Vol. 5, John Wiley & Sons Inc., New York 1966, p. 847).

The polymerization is preferably conducted in the presence of from 0.01 to 3% by weight and, in particular, from 0.05 to 1.5% by weight of a seed latex (solids content of the seed latex, based on overall monomer amount), preferably with an initially introduced seed latex (initial-charge seed). The latex generally has a ponderal median particle size of from 10 to 100 nm and, in particular, from 20 to 50 nm. Examples of its constituent monomers are styrene, methyl methacrylate, n-butyl acrylate and mixtures thereof, and to a minor extent it may also contain monomers M2 or M3 in copolymerized form, preferably in an amount of less than 10% of the overall weight of the polymer particles in the seed latex.

The pressure and temperature of polymerization are of minor importance. It is generally conducted at between room temperature and 120° C., preferably at from 40 to 95° C. and, with particular preference, at between 50 and 90° C.

Following the polymerization reaction proper it may be necessary substantially to free the aqueous polymer dispersions of the invention from odoriferous substances, such as residual monomers and other volatile organic constituents. This can be done, conventionally, physically by distillative removal (especially by steam distillation) or by stripping with an inert gas. The amount of residual monomers can also be lessened chemically by free-radical post-polymerization, in particular under the action of redox initiator systems as are listed, for example, in DE-A 44 35 423, DE-A 44 19 518 and DE-A 44 35 422. The post-polymerization is preferably conducted with a redox initiator system comprising at least one organic peroxide and an organic sulfite.

By emulsion polymerization it is possible in principle to obtain dispersions having solids contents of up to about 80% by weight (polymer content, based on the overall weight of the dispersion). With practical considerations in mind, the majority of applications will generally prefer polymer dispersions having solids contents in the range from 30 to 70% by weight.

In the process of the invention the salts S are added to the aqueous polymer dispersion. Insofar as the aqueous polymer dispersions are prepared by free-radical aqueous emulsion polymerization it is also conceivable in principle to employ the salts S in the actual preparation of the aqueous polymer dispersions. Although this is possible in principle, the stabilizing effect is much lower in this case. It is therefore preferred in accordance with the invention to add the salts S to the aqueous polymer dispersion only after the polymerization reaction. Where the aqueous polymer dispersion is subjected to chemical or physical deodorization following its preparation, it is preferred to add the salts S to the aqueous polymer dispersion before it is deodorized. The salts S are preferably added prior to any filtration or pumping operation.

The process of the invention stabilizes the aqueous polymer dispersions to mechanical and thermal stresses. The aqueous polymer dispersions treated in accordance with the invention are found to be stable in particular under the action of shear forces such as occur, for example, in the course of the stirring, pumping, filtering or compounding of aqueous dispersions. The dispersions treated by the process of the invention are also better stabilized against thermal stresses such as occur, for example, in the course of physical deodorization. In addition, the dispersions treated in accordance with the invention are more stable to the addition of salts (introduction of electrolyte).

The improved stability of the dispersion is manifested not only in a reduced propensity to form coagulum (formation of gel specks) but also in increased stability of the dispersions to aggregation of the polymer particles with a change in the particle size distribution. Little or no change in the particle size, as characterized by a change in the LT value, is observed in the dispersion even when it is subject to prolonged thermal or mechanical stress. For this reason, the aqueous polymer dispersions stabilized by the process of the invention are particularly suitable for applications which entail high shear forces; for example, in papermaking or paper treatment or in the production of films which are coated with polymer dispersions.

The nonlimiting examples which follow are illustrative of the invention.

EXAMPLES

I. Analysis

Determining the size and number of the polymer particles

The size distribution of the polymer particles was determined by the coupling-PSD technique in an analytical ultracentrifuge (see W. Mächtle, Angewandte makromolekulare Chemie, 1988, 162, pp. 35–42).

Determining the light transmissitivity

The light transmissitivity (LT) was determined on dilute aqueous polymer solutions which had been diluted with deionized water to a solids content of 0.01% by weight. This LT is the relative light transmissitivity for white light (osram bulb, type 8100; detector: selenium photoelement with maximum sensitivity at 550 nm) relative to water (path length 2.5 cm).

II. Preparing the Dispersions (General Procedure)

A polymerization reactor was charged with 116 g of deionized water and 0.28 g of polystyrene seed polymer (in the form of an aqueous dispersion; $d_{50}$=30 nm) and this initial charge was heated to 85° C. At the same temperature, 10% of the initiator seed stream was added to the initial charge. After 5 minutes, still at the same temperature and beginning simultaneously, the monomer feed and initiator feed streams were added to the polymerization reactor over the course of 180 minutes. The polymerization temperature was then maintained for a further 30 minutes. Subsequently, at 85° C., 5.6 g of a 10% strength by weight aqueous solution of tert-butyl hydroperoxide and 7.5 g of an aqueous solution of the sodium bisulfite adduct of acetone (12% strength) were added. The dispersion was subsequently cooled to room temperature and neutralized to pH=7 with 15% strength by weight sodium hydroxide solution. The solids content of the dispersion was from about 55 to 57% by weight.

Monomer feed stream: aqueous emulsion comprising 275.0 g of deionized water 560.0 g of monomers (see Table 1)* x g of emulsifier (see Table 1)**

0.3 g of tert-dodecyl mercaptan

* Type and relative amount indicated in Table 1
** Type and relative amount indicated in Table 1; the percentages indicated relate to 100% by weight of monomers: 0.1% by weight therefore corresponds to 0.56 g of emulsifier.

Initiator feed stream: solution of 2.8 g of sodium peroxodisulfate in 37.2 g of water The composition of the aqueous polymer dispersions in terms of their monomers, and the emulsifiers used for the polymerization, are summarized in Table 1.

TABLE 1

| Dispersion | Monomers [% by wt.] | Emulsifiers[1] [% by wt.] | LT [%][2] before | after |
|---|---|---|---|---|
| D1 | 84 BA; 15 MMA; 1AA | 0.3 E2; 0.4 E1 | 35 | 15 |
| D2 | 84 BA; 13 S; 3 AA | 0.6 E1; 0.4 E3 | 35 | 8 |
| D2a | 84 BA; 13 S; 3 AA | 0.6 E1; 0.4 E2 | 33 | 14 |
| D2b | 84 BA; 13 S; 3 AA | 0.6 E3; 0.4 E2 | 33 | 9 |
| D3 | 51 BA; 33 EHA; 13 S; 3 AA | 0.6 E1; 0.4 E3 | 33 | 6 |
| D4 | 74 BA; 25 S; 1 AA | 0.4 E1; 0.3 E2 | 28 | 14 |
| D5 | 84 BA; 15 MMA; 1 AA | 0.5 E1; 0.3 E2 | 37 | 13 |
| D5a | 84 BA; 15 MMA; 1 AA | 0.5 E3; 0.3 E2 | 36 | 17 |

[1]Amount of emulsifier, based on overall monomer amount
[2]Light transmissitivity of the non-post-hydrolyzed dispersion before and after shearing
BA n-butyl acrylate
EHA 2-ethylhexyl acrylate
MMA Methyl methacrylate
S Styrene
AA Acrylic acid
E1 DOWFAX ® 2A1 (DOW CHEMICAL); dodecylphenoxybenzene-disulfonic acid sodium salt
E2 α-sulfo-ω-dodecylocypolyethylene oxide (about 30 EO units); DISPONIL FES 77 from HENKEL KGaA
E3 Bis-2-ethylhexylsulfosuccinic acid sodium salt III. Determining the Stability of Post-hydrolyzed Polymer Dispersions The stability was determined by measuring the shear stability of the aqueous polymer dispersions. For this purpose the aqueous polymer dispersions were treated in a shear apparatus (Dispermat, VMA Getzmann GmbH, D-51580 Reichshof) with a rotating disk (dissolver disk; ∅ 20 mm with 5 mm internal hole, 16 teeth; VMA Getzmann GmbH) at 10,000 rpm for 10 minutes. The light transmissitivity was determined before and after shearing. Deviation in the light transmissitivity by more than 2 percentage points indicates a change in the size distribution of the particles in the aqueous polymer dispersion. The results are summarized in Tables 2a, 2b, 3 and 4.

TABLE 2a

| Ex. | Dispersion | Emulsifiers[1] [% by wt.] | LT[2] [%] before | after |
|---|---|---|---|---|
| C1 | D1 | — | 35 | 15 |
| C2 | D1 | E1; 0.5 | 36 | 12 |
| 3 | D1 | E3; 0.5 | 36 | 36 |
| 4 | D1 | E3; 0.75 | 37 | 35 |
| 5 | D1 | E1; 0.5 + E3; 0.5 | 36 | 38 |

[1]subsequently added emulsifier, based on the weight of the polymer in the dispersion
[2]light transmissitivity of the dispersion before and after shearing
E1 DOWFAX ® 2A1 (DOW CHEMICAL)
E2 DISPONIL FES 77 (HENKEL KGaA)
E3 Bis-2-ethylhexylsulfosuccinic acid sodium salt
E4 Sodium lauryl sulfate TABLE 2b

| Example | Dispersion | Emulsifiers[1] [% by wt.] | LT[2] [%] before | after |
|---|---|---|---|---|
| 6 | D2 | E3 0.8 | 35 | 36 |
| C7 | D2 | E1 0.8 | 35 | 11 |
| C8 | D2 | E4 0.8 | 35 | 22 |
| C9 | D2 | E5 0.8 | 35 | 30 |
| C10 | D2 | E2 0.8 | 35 | 11 |
| C11 | D2 | E6 0.8 | 35 | 8 |
| C12 | D3 | E3 0.8 | 33 | 32 |
| C13 | D3 | E1 0.8 | 33 | 10 |
| C14 | D3 | E4 0.8 | 33 | 7 |
| C15 | D3 | E5 0.8 | 33 | 6 |
| C16 | D3 | E2 0.8 | 33 | 12 |
| C18 | D3 | E6 0.8 | 33 | 10 |
| C19 | D1 | E7 0.8 | 35 | 14 |
| C20 | D2 | E7 0.8 | 35 | 29 |
| C21 | D3 | E7 0.8 | 33 | 16 |

[1]subsequently added emulsifier, based on the weight of the polymer in the dispersion
[2]light transmissitivity of the dispersion before and after shearing
E5 Dodecylbenzene sulfonate sodium salt
E6 α-sulfo-ω-dodecyloxypolyethylene oxide sodium salt (2.5 EO)
E7 ethoxylated isotridecanol (8 EO)

TABLE 3

| Example | Dispersion | Emulsifiers[1] [% by wt.] | LT[2] [%] before | after |
|---|---|---|---|---|
| C22 | D4 | — | 28 | 14 |
| C23 | D4 | E1 0.75 | 28 | 23 |
| C24 | D4 | E2 0.75 | 28 | 20 |
| 25 | D4 | E3 0.75 | 28 | 28 |

[1]subsequently added emulsifier, based on the weight of the polymer in the dispersion
[2]light transmissitivity of the dispersion before and after shearing

TABLE 4

| Example | Dispersion | Emulsifiers [% by wt.] before[1] | after[2] | LT[3] [%] before | after |
|---|---|---|---|---|---|
| 26 | D2a | E1 (0.6); E2 (0.4) | E3 (0.6) | 33 | 33 |
| C27 | D2b | E3 (0.6); E2 (0.4) | E1 (0.6) | 33 | 14 |
| 28 | D5 | E1 (0.5); E2 (0.3) | E3 (0.5) | 37 | 38 |
| C29 | D5a | E3 (0.5); E2 (0.3) | E1 (0.5) | 36 | 25 |

[1] Emulsifier during polymerization
[2] Emulsifier after polymerization
[3] Light transmissitivity before and after shearing

We claim:

1. A process for improving the stability of an aqueous polymer dispersion to thermal and/or mechanical events, which comprises adding at least one salt of a bis-$C_4$–$C_{18}$-alkyl ester of a sulfonated dicarboxylic acid having 4 to 8 carbon atoms (=salt S) to the aqueous polymer dispersion after its preparation, wherein the polymer particles of the aqueous polymer dispersion have a ponderal median particle size $d_{50}$ in the range from 50 to 1000 nm, wherein the polymer comprises ethylenically unsaturated monomers M which comprise at least 50% by weight, based on the overall weight of the monomer M, of one or more monomers M1 which are selected from the group consisting of vinylaromatic monomers, the $C_1$–$C_{12}$-alkyl esters and the $C_5$–$C_8$-cycloalkyl esters of ethylenically unsaturated mono- and dicarboxylic acids having 3 to 8 carbon atoms, butadiene, and $C_2$–$C_6$-olefins, wherein the salt S is added in an amount of from 0.5 to 5% by weight, based on the weight of the polymer in the aqueous polymer dispersion.

2. The process as claimed in claim 1, wherein the salt S is selected from the group consisting of the salts of bis-$C_4$–$C_{18}$-alkyl esters of sulfonated succinic acid.

3. The process as claimed in claim 1, wherein the polymer has a glass transition temperature $T_g$ in the range from −80° C. to +110° C.

4. The process as claimed in claim 1, wherein the monomers M1 comprise:
   from 25 to 100% by weight of at least one monomer M1a selected from the group consisting of the $C_1$–$C_{12}$-alkyl esters of acrylic acid, and
   from 0 to 75% by weight of at least one monomer M1b selected from the group consisting of the $C_1$–$C_4$-alkyl esters of methacrylic acid and from vinylaromatic monomers,
   the weight of the monomers M1a and M1b adding up to 100% by weight.

5. The process as claimed in claim 1, wherein the monomers M comprise
   from 0.1 to 10% by weight, based on the overall weight of the monomers M, of at least one ethylenically unsaturated monomer M2 which has at least one acidic functional group.

6. The process as claimed in claim 1, wherein the aqueous polymer dispersion is obtainable by free-radical aqueous emulsion polymerization of the monomers M.

* * * * *